United States Patent [19] [11] 4,152,629
Raupp [45] May 1, 1979

[54] LAMP RESPONSIVE TO THE HUMAN TOUCH UPON A LIVING PLANT AND CONTROL SYSTEM THEREFOR

[76] Inventor: Harry F. Raupp, 27 Kushaque Trail North, Hewitt, N.J. 07421

[21] Appl. No.: 806,697

[22] Filed: Jun. 15, 1977

[51] Int. Cl.² ............ H05B 37/02; H05B 39/06; H05B 41/04; H05B 41/18
[52] U.S. Cl. .................... 315/362; 307/132 EA; 307/147; 200/DIG. 1
[58] Field of Search ........... 307/128, 132 EA, 252 R, 307/116, 146, 147, 308; 315/209 SC, 362; 200/DIG. 1, DIG. 2; 361/181; 340/279

[56] References Cited
U.S. PATENT DOCUMENTS

| 3,748,496 | 7/1973 | Hedin et al. | 307/308 X |
| 3,922,563 | 11/1975 | Penman | 200/DIG. 1 |
| 4,031,408 | 6/1977 | Holz | 307/116 |

Primary Examiner—Alfred E. Smith
Assistant Examiner—Robert E. Wise
Attorney, Agent, or Firm—Samuelson & Jacob

[57] ABSTRACT

A system for controlling an electrical circuit, such as a lamp circuit, in response to the human touch whereby the circuit may be turned on and off by means of the human touch upon a conductive element of the circuit, one such conductive element being a portion of a living plant electrically connected within the system.

13 Claims, 5 Drawing Figures

LAMP RESPONSIVE TO THE HUMAN TOUCH UPON A LIVING PLANT AND CONTROL SYSTEM THEREFOR

The present invention relates generally to electrical control systems and pertains, more specifically, to a system for controlling an electrical circuit, such as a lamp circuit, by means of the human touch, and especially in response to the human touch upon a living plant.

A wide variety of electrical control systems are available in which an electrical circuit is switched from one state to another by means of the human touch. These systems are responsive to various characteristics of the human touch and have varying degrees of sensitivity, complexity and reliability. It has been suggested that lamp circuits can be controlled by such systems so that a lamp can be turned on and off selectively by merely touching some designated portions of the lamp structure. Indeed, such lamps have been operated successfully.

It is an object of the present invention to provide a system for controlling an electrical circuit by means of the human touch whereby the circuit may be turned on and off in response to the human touch upon a conductive element of the system, with consecutive touches upon the same element resulting in the desired changes in state of the circuit.

Another object of the invention is to provide a system of the type described and having a relatively wide range of sensitivity to the human touch, enabling the system to be used in connection with a lamp circuit operated in response to the human touch upon a living plant connected in the system.

Still another object of the invention is to provide a system of the type described which is relatively simple in construction and compact so as to enable a wide variety of uses.

A further object of the invention is to provide a system of the type described which can be used with safety.

A still further object of the invention is to provide a system of the type described which is reliable and is relatively inexpensive to fabricate in large numbers of consistent quality.

The above objects, as well as still further objects and advantages, are attained by the present invention which may be described briefly as a system for controlling an electrical circuit by means of the human touch, the system being capable of operating from a supply of voltage, said system comprising a solid-state CMOS D-type flip-flop having a clock input, a data input and a pair of complementary outputs, the solid-state flip-flop having a mode of operation wherein data available at the data input is reflected at one of the complementary outputs in response to a given threshold voltage at the clock input, a sensing circuit including a conductive element connected to the clock input of the solid-state flip-flop for receiving voltage pulses in response to the human touch upon the conductive element, a connection between the data input and the other of the complementary outputs of the solid-state flip-flop such that the state of the flip-flop is transferred between a first state and a second state each time a pulse exceeding the given threshold voltage is applied at the clock input, a voltage regulator connected between the supply of voltage and the solid-state flip-flop for providing a predetermined operating voltage to the solid-state flip-flop, the operating voltage being selected such that the voltage pulses applied to the conductive element in response to the human touch effect the pulse exceeding the given threshold voltage at the clock input, and a high-current solid-state on-off switch having a control input connected to the one of the complementary outputs of the solid-state flip-flop, and a controlled output connected to the electrical circuit such that the electrical circuit is turned on and off in response to the human touch upon the conductive element.

The invention will be more fully understood, while still further objects and advantages will become apparent, in the following detailed description of preferred embodiments of the invention illustrated in the accompanying drawing, in which.

Figure 1:
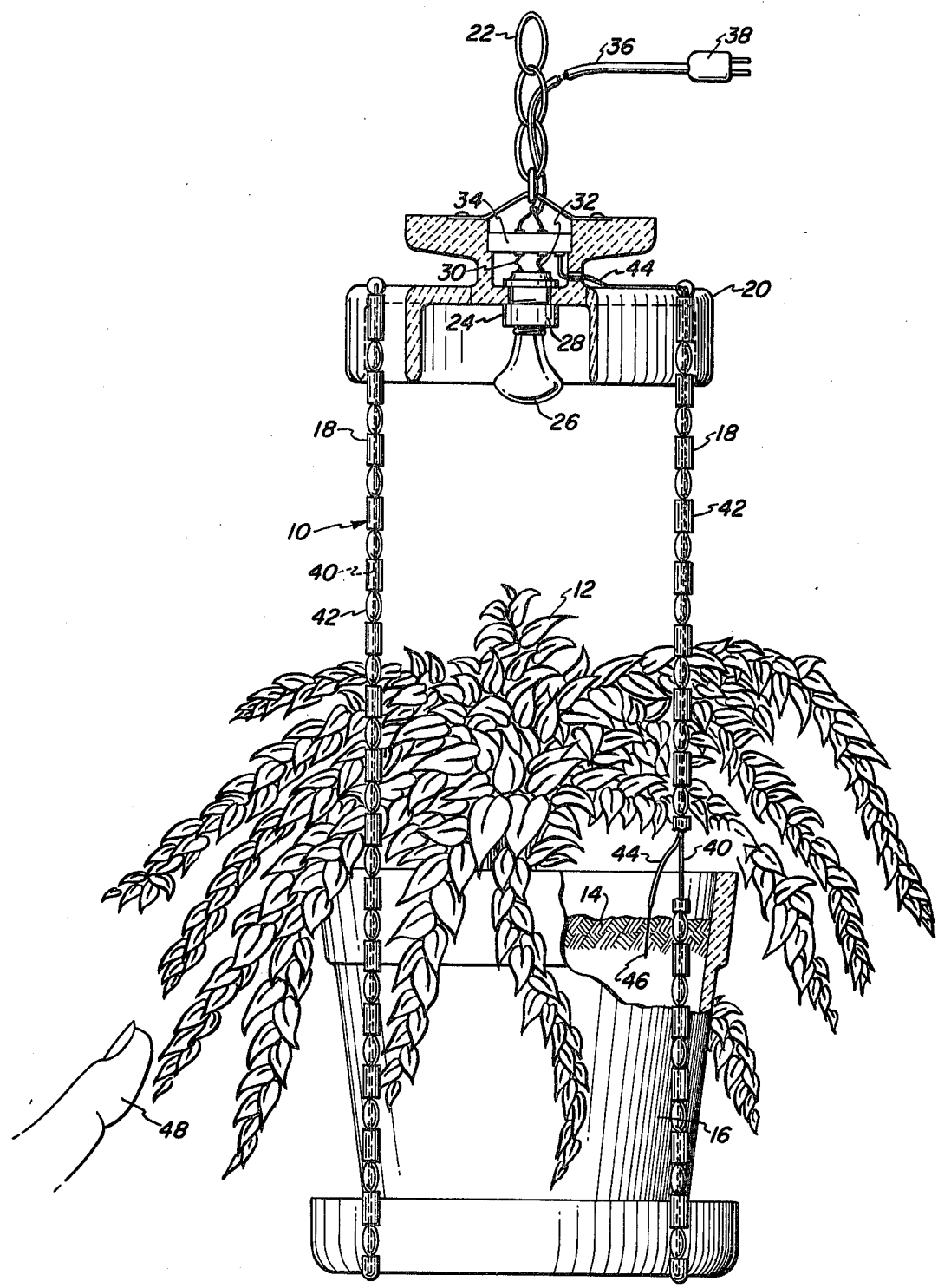
FIG. 1 is an elevational view, partially cut away, of a hanging living plant and a lamp controlled by the human touch upon the plant through a system constructed in accordance with the invention.

Referring now to the drawing, and especially to FIG. 1 thereof, a hanging plant assembly 10 is seen to include a living plant 12 potted in soil 14 contained within a ceramic plant pot 16 suspended by a pair of beaded loops 18 from a ceramic fixture 20 which itself is hung upon a chain 22. A lamp 24 includes a light bulb 26 within a socket 28 secured to the fixture 20 and connected by conductors 30 and 32 to a control system 34. A line cord 36 is likewise connected to control system 34 and provides a source of alternating voltage thereto when the plug 38 is connected to an appropriate receptacle (not shown).

Each beaded loop 18 includes a support strand 40 carrying a plurality of decorative beads 42. Both the strands 40 and the beads 42 preferably are constructed of electrically non-conductive materials, as are the pot 16 and fixture 20, for purposes which will be made apparent hereinafter. A sensing conductor 44, also connected to control system 34, is threaded through at least some of the beads 42 of one of the loops 18 so as to extend to the soil 14 in the pot 16, the bared lower end 46 of conductor 44 being buried in the soil 14 to make an electrical connection between the soil 14 and the control system 34. Light bulb 26 preferably is an ordinary household light bulb, but may be a so-called "grow light" for aiding the growth of the living plant 12. Control system 34 operates lamp 24 in a manner which will now be described to turn the lamp on and off in response to the touch of a human 48 upon any living portion of the plant 12.

Figure 2:
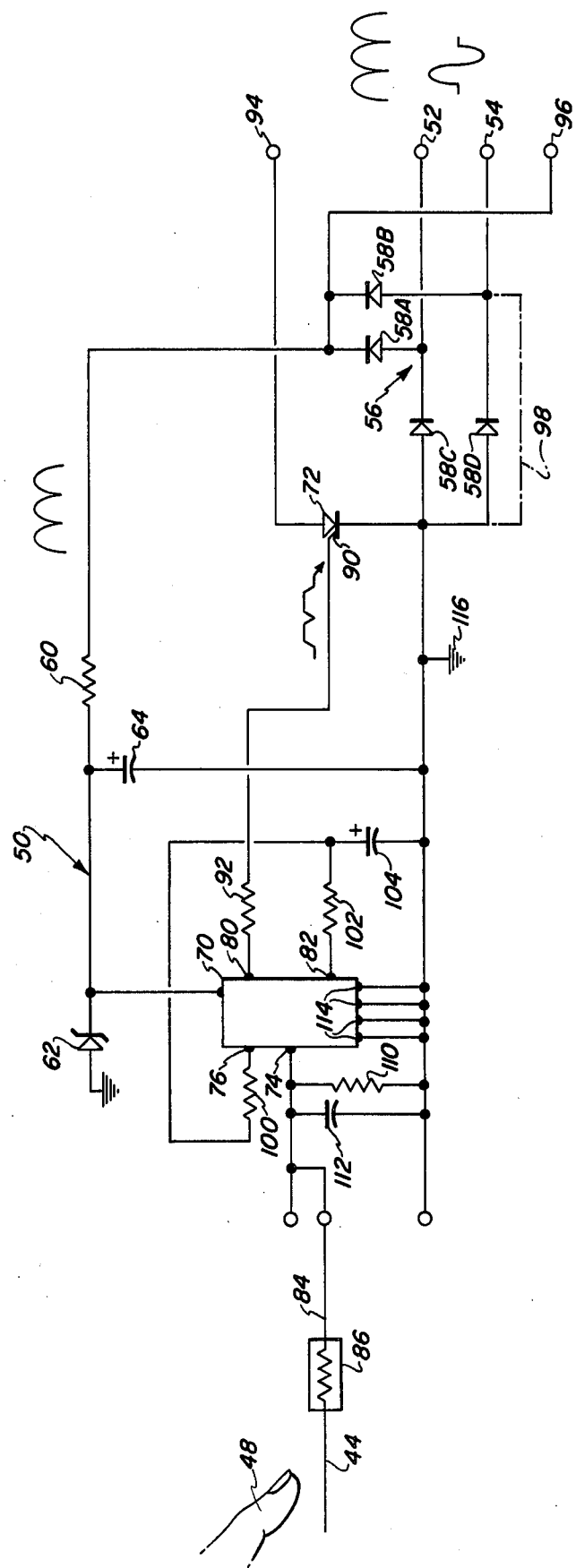
FIG. 2 is a circuit diagram of the system.

Turning now to FIG. 2, the electrical circuit for the control system 34 is shown at 50. Line cord 36 is connected at terminals 52 and 54 to provide a supply of voltage, in this instance the voltage being an alternating voltage of 120 vRMS. A rectifier 56 in the form of a full-wave bridge including four diodes 58a, 58b, 58c and 58d is connected across the terminals 52 and 54 and provides full wave rectified voltage to a voltage regulator in the form of a resistor 60 which acts as a current limiter to a zener diode 62 and a capacitor 64. The junction of resistor 60, zener diode 62 and capacitor 64 is connected to an integrated circuit 70 to provide the filtered DC necessary for the operation of the integrated circuit 70. Integrated circuit 70 is a solid-state flip-flop in the form of a CMOS D-type flip-flop logic device. It is employed in circuit 50 as a memory element (latch), a high impedance voltage sensitive switch, and a driver for a high-current solid-state switch 72 in the form of an SCR. The use of the CMOS for integrated circuit 70 enables construction of the system 34 with a minimum number of parts and at a relatively low cost. The CMOS integrated circuit is currently mass produced and sold in large quantities at low price.

The operating voltage for the CMOS integrated circuit 70 can be varied over a relatively wide range of about 3 v to 15 v. The operating voltage is selected by the choice of the zener diode 62 and determines the threshold voltage that must be presented to a control input, known as the "clock input", of the integrated circuit 70 in order to operate the integrated circuit. In addition to a clock input 74, the integrated circuit 70 includes a data input 76 and a pair of complementary outputs 80 and 82. The mode of operation of integrated circuit 70 is such that the data available at the data input 76 is reflected at the one complementary output 80 in response to the application of the predetermined threshold voltage at the clock input 74.

A sensing circuit 84 is connected to the clock input 74 and includes the sensing conductor 44 and a safety resistor 86 of very high resistance, in the order of 500,000 ohms, which limits leakage current to less than 0.5 milliamps. When a human 48 touches the sensing conductor 44, or another conductive element connected in the sensing circuit, the AC voltage present in the human body is applied to the clock input 74 of the integrated circuit 70. Because the integrated circuit can be operated over a relatively wide voltage range, the appropriate value of zener diode 62 may be chosen to select a magnitude for the threshold voltage required at clock input 74 so that the AC voltage applied by the human touch will exceed the required threshold voltage.

When the voltage applied to the clock input 74 exceeds the threshold voltage, the data available at the data input 76 is clocked into the flip-flop of the integrated circuit 70 and is reflected at the output 80. The other output 82 is connected to the data input 76. Since the signal at output 82 always reflects the inverse of the signal at output 80, the flip-flop is connected in what is known as a toggle mode; that is, each time a voltage pulse greater than the threshold voltage is applied to the clock input 74, the flip-flop changes its state between a first state and a second state, reversing the signals at the complementary outputs 80 and 82.

The output 80 is connected to the control input 90 of the switch 72 (the control electrode of the SCR) through a resistor 92. When the flip-flop is in its first state, the voltage at output 80 provides the power necessary to operate the switch 72. The lamp 24 is connected, by means of conductors 30 and 32, across terminals 94 and 96. When the flip-flop is in the first state, the voltage at output 80 operates the switch 72 so that the switch conducts and the lamp 24 is turned on. When the flip-flop is in the second state, the voltage at output 80 is such that the switch 72 does not conduct and the lamp 24 is turned off. It is noted that connection of the lamp 24 across terminals 94 and 96 provides full-wave rectified voltage to the lamp.

Optionally, half-wave rectified voltage may be provided to the lamp 24 by connecting the lamp across terminals 94 and 52 or across terminals 94 and 54. The provision of half-wave rectified voltage to the lamp 24 will extend the life of the light bulb 26 considerably, enabling the light bulb to function over a period of thirty to forty times the normal life under full-wave operation. Such extended life is particularly advantageous when using a more expensive grow light. Half-wave operation also enables the elimination of the phenomenon known as "flashover" which occurs upon failure of a light bulb operating under full-wave conditions. Such flashover causes a large surge of current which can cause catastrophic failure of components in the circuit. Lamp 24 also may be operated under half-wave conditions by the elimination of diodes 58b, 58c and 58d, replacing diode 58d with a conductor, as shown in phantom at 98 in FIG. 2, and connecting lamp 24 across terminals 94 and 96 or across terminals 94 and 52. In that instance, half-wave rectified voltage is also provided to the integrated circuit 70. Since integrated circuit 70 is able to operate over a relatively wide range of supply voltage, such half-wave rectified voltage will not have a deleterious effect on the operation of integrated circuit 70. By the elimination of three diodes, the circuit becomes more reliable and even more economical to fabricate.

Because the voltage signal applied by the human touch is in the form of a rapid series of pulses, all of which can exceed the threshold voltage, it is desirable to provide a time delay between the appearance of a signal at the other output 82 of integrated circuit 70 and the arrival of that signal at data input 76. In this manner, only the first pulse of the series of pulses pesent during each touch will actuate the lamp 24. Thus, a time-delay circuit in the form of resistors 100 and 102 and capacitor 104 is placed in the connection between output 82 and data input 76. A time delay interval of about 470 milliseconds has been found to be satisfactory. Hence, a touch having a duration of less than the chosen time delay interval will switch the lamp 24 once. The next consecutive touch will switch the lamp again. Should the duration of the touch exceed the time delay interval, the lamp will be switched without withdrawal of the touch. Such a mode of operation will cause the lamp to blink at a rate set by the time delay interval, providing a strobe-like effect.

Resistor 110 and capacitor 112 are provided to lower the input impedance of the clock input 74 of the integrated circuit 70 so as to preclude triggering by stray electrical noise. Unused inputs 114 are connected to equipment ground 116.

Figure 3:
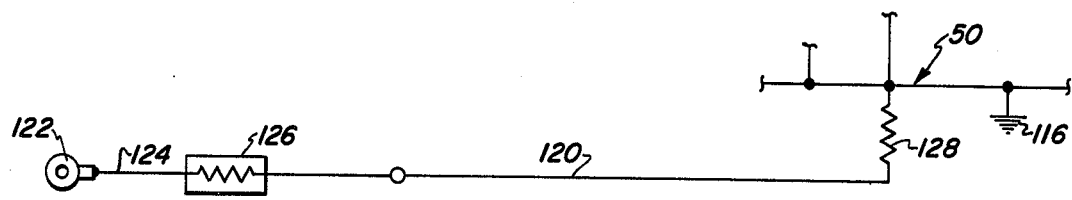
FIG. 3 is a fragmentary circuit diagram showing an optional additional portion of the system.

In some installations, such as in a table lamp assembly (not shown) heavy metal parts are present which could provide enough electrical noise to trigger the integrated circuit. In those instances, a grounding circuit is provided, as seen in FIG. 3 at 120, to eliminate the effect of the noise. Grounding circuit 120 includes a grounding lug 122, for connection to the heavy metal parts, connected to a lead wire 124 which, in turn, is connected to equipment ground 116 through a very high resistance safety resistor 126 and a further resistor 128.

Figure 4:
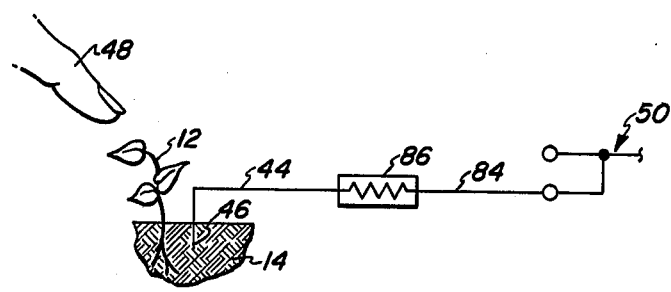
FIG. 4 is a fragmentary circuit diagram illustrating the connection of the living plant in the system.

FIG. 4 illustrates diagrammatically the connection between the living plant 12 and the electrical circuit 50 in the plant assembly 10. The lower end 46 of the sensing conductor 44 is buried in the soil 14 so that the living plant 12 is placed in sensing circuit 84 and an electrical path is completed between the living plant 12 and the circuit 50. The sensitivity of the integrated circuit 70 is adjusted, by the selection of the appropriate value for zener diode 62, so that a human touch applied to any living portion of plant 12 will provide a voltage pulse, by virtue of the conductivity of the plant 12 and the soil 14, sufficient to exceed the threshold voltage needed at clock input 74 to transfer the flip-flop from one to the other of the first and second states, thereby turning the lamp 24 on or off. Since the plant pot 16, beaded loops 18, and fixture 20 all are constructed of non-metallic, non-conductive materials, electrical noise is minimized and the grounding circuit 120 of FIG. 3 is unnecessary.

Figure 5:
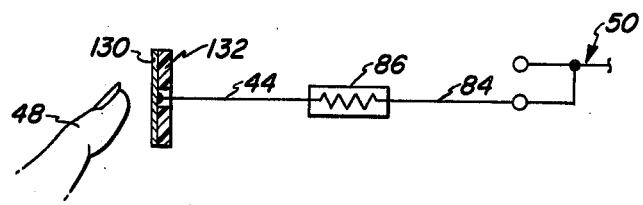
FIG. 5 is a fragmentary circuit diagram illustrating an alternate embodiment wherein a touch-sensitive plate is connected in the system.

FIG. 5 illustrates diagrammatically an alternate embodiment wherein the circuit 50 is operated in response to the human touch upon a conductive surface 130 of a plate 132. Conductive surface 130 is placed in sensing circuit 84 so that pulses applied by the human touch are conducted to circuit 50 through sensing conductor 44 and safety resistor 86. Again, the choice of the value of zener diode 62 adjusts the sensitivity of integrated circuit 70 so that circuit 50 will be operated in response to the human touch upon surface 130 of plate 132. As an example, plate 132 may be mounted upon a room wall and circuit 50 would be utilized to turn on and off a lamp within the room.

It is to be understood that the above detailed description of embodiments of the invention is provided by way of example only. Various details of design and construction may be modified without departing from the true spirit and scope of the invention as set forth in the appended claims.

The embodiments of the invention in which an exclusive property or privilege is claimed are defined as follows:

1. A system for controlling an electrical circuit by means of the human touch, the system being capable of operating from a supply of voltage, said system comprising:
   a solid-state CMOS D-type flip-flop logic device having a clock input, a data input and a pair of complementary outputs, the solid-state flip-flop having a mode of operation wherein data available at the data input is reflected at one of the complementary outputs in response to a given threshold voltage at the clock input;
   a sensing circuit including a conductive element connected to the clock input of the solid-state flip-flop for receiving voltage pulses in response to the human touch upon the conductive element;
   a connection between the data input and the other of the complementary outputs of the solid-state flip-flop such that the state of the flip-flop is transferred between a first state and a second state each time a pulse exceeding the given threshold voltage is applied at the clock input;
   a voltage regulator connected between the supply of voltage and the solid-state flip-flop for providing a predetermined operating voltage to the solid-state flip-flop, the operating voltage being selected such that the voltage pulses applied to the conductive element in response to the human touch effect the pulse exceeding the given threshold voltage at the clock input; and
   a high-current solid-state on-off switch having a control input connected to the one of the complementary outputs of the solid-state flip-flop, and a controlled output connected to the electrical circuit such that the electrical circuit is turned on and off in response to the human touch upon the conductive element;
   the sensing circuit further including a living plant potted in soil and a conductor connecting the soil with the clock input, the conductive element including a portion of the living plant, whereby the electrical circuit is controlled by the human touch upon the portion of the living plant.

2. The invention of claim 1 wherein the connection between the data input and the other of the complementary outputs of the solid-state flip-flop includes a time-delay circuit providing a time delay interval such that the electrical circuit is operated between the on and off states only in response to the initial voltage pulse of each consecutive human touch upon the conductive element of a given duration less than the time delay interval provided by the time-delay circuit.

3. The invention of claim 1 wherein the solid-state on-off switch is an SCR, the control input comprising the control electrode of the SCR and the controlled output comprising the output of the SCR.

4. The invention of claim 3 wherein the voltage regulator includes a current limiting means connected to the voltage supply, and a zener diode connected between the current limiting means and equipment ground.

5. The invention of claim 4 wherein the supply of voltage supplies an alternating voltage and the system includes a rectifier connected between the supply of voltage and the voltage regulator.

6. The invention of claim 5 wherein the rectifier is a full-wave rectifier.

7. The invention of claim 6 including means for applying full-wave rectified voltage to the electrical circuit.

8. The invention of claim 6 wherein the electrical circuit includes a lamp, the invention further including means for applying half-wave rectified voltage to the lamp in the electrical circuit.

9. The invention of claim 5 wherein the rectifier is a half-wave rectifier, the electrical circuit includes a lamp, and the invention further includes means for applying half-wave rectified voltage to the lamp in the electrical circuit.

10. The invention of claim 5 wherein the electrical circuit includes a lamp.

11. In a lamp having a solid-state control system capable of operation in response to the human touch upon a conductive element in a sensing circuit of the control system for turning the lamp on and off, the improvement wherein the sensing circuit includes a living plant potted in soil and a conductor connecting the soil with the control system such that the conductive element comprises a portion of the living plant, whereby the lamp is turned on and off by the human touch upon the portion of the living plant.

12. The invention of claim 1 wherein the electrical circuit includes a lamp.

13. The invention of claim 1 wherein the connection between the data input and the other of the complementary outputs of the solid-state flip-flop includes a time-delay circuit providing at time delay interval such that the electrical circuit is operated between the on and off states only in response to the initial voltage pulse of each consecutive human touch upon the conductive element of a given duration less than the time delay interval provided by the time-delay circuit.

* * * * *